Dec. 21, 1937.  H. H. COUCH  2,102,614
METHOD OF PRODUCING AND DISTINGUISHING FREQUENCY VIBRATIONS
Filed Sept. 20, 1935   5 Sheets-Sheet 1
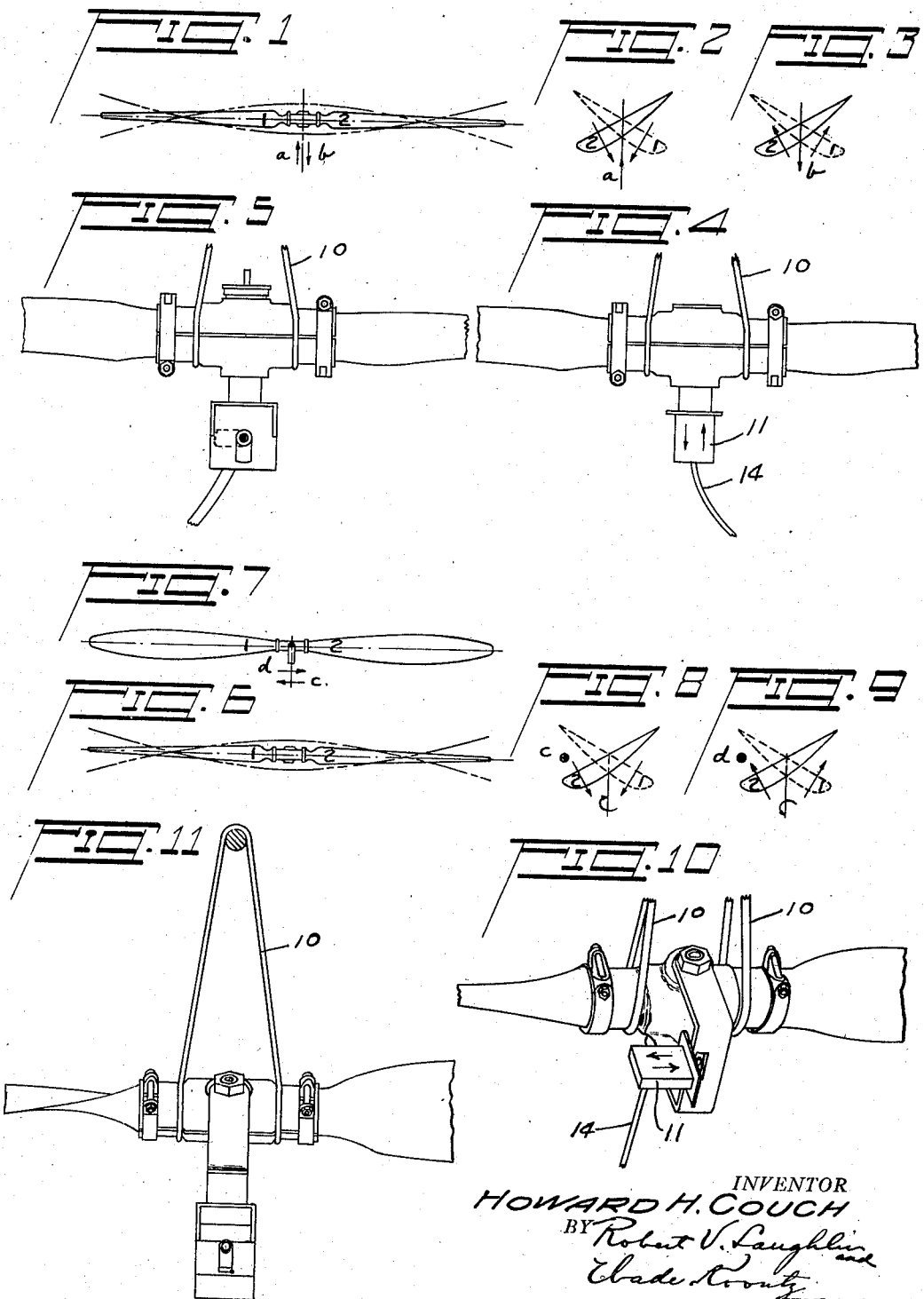
INVENTOR
HOWARD H. COUCH
BY Robert V. Laughlin and
Clade Koontz
ATTORNEYS

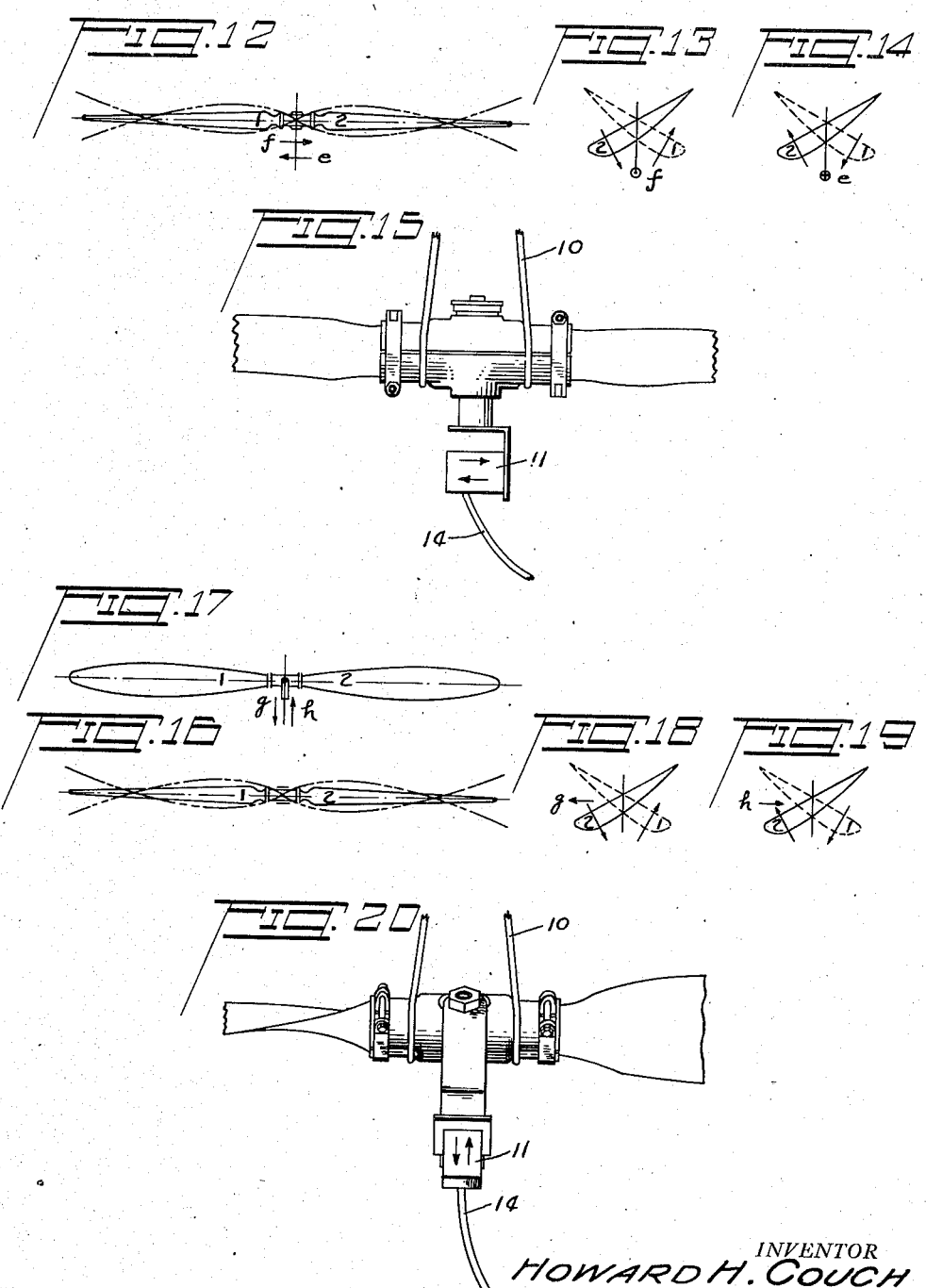

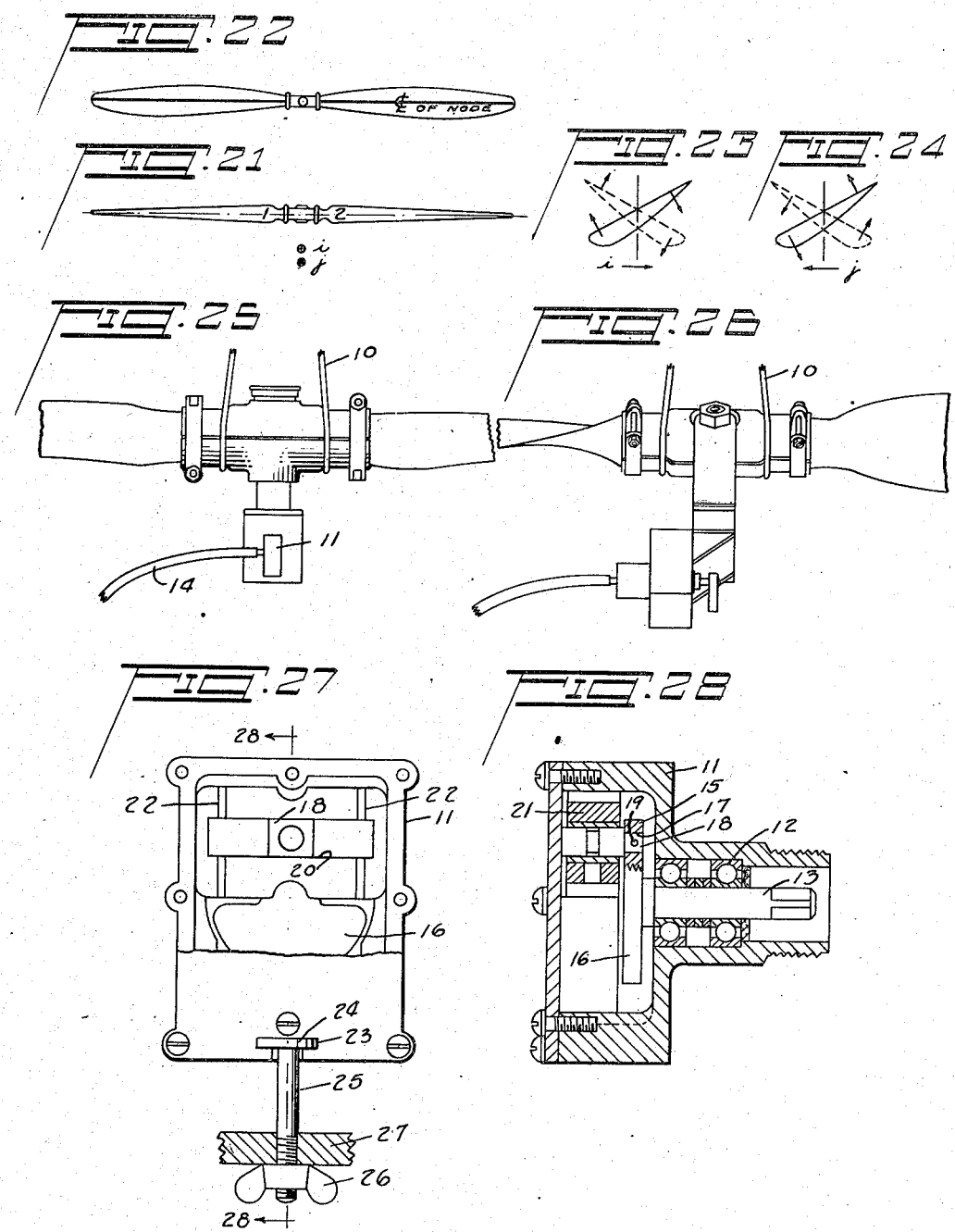

Dec. 21, 1937.   H. H. COUCH   2,102,614
METHOD OF PRODUCING AND DISTINGUISHING FREQUENCY VIBRATIONS
Filed Sept. 20, 1935    5 Sheets-Sheet 4
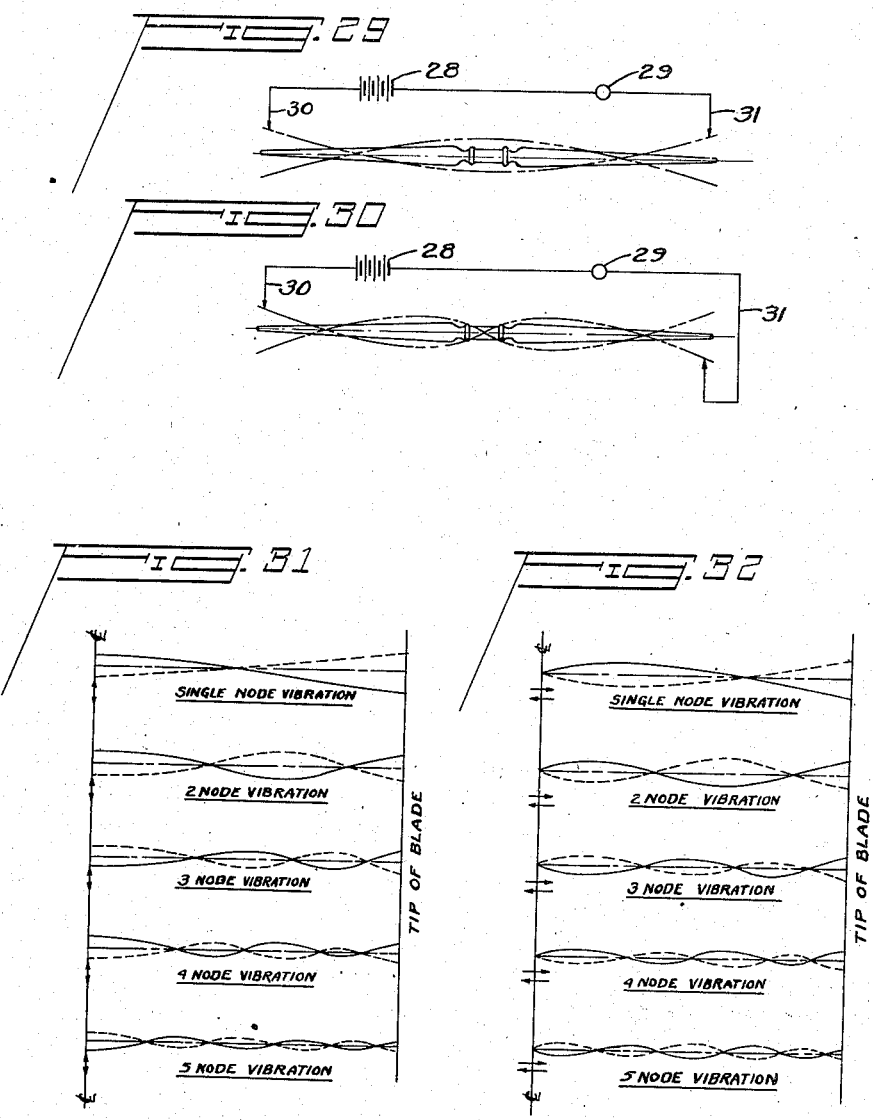
INVENTOR
HOWARD H. COUCH
BY
ATTORNEYS Dec. 21, 1937.  H. H. COUCH  2,102,614
METHOD OF PRODUCING AND DISTINGUISHING FREQUENCY VIBRATIONS
Filed Sept. 20, 1935  5 Sheets-Sheet 5

INVENTOR
HOWARD H. COUCH
BY
ATTORNEYS

Patented Dec. 21, 1937

2,102,614

UNITED STATES PATENT OFFICE 2,102,614

METHOD OF PRODUCING AND DISTINGUISHING FREQUENCY VIBRATIONS

Howard H. Couch, Fairfield, Ohio

Application September 20, 1935, Serial No. 41,431

17 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to methods for producing and distinguishing frequency vibrations and is particularly adapted for use in connection with methods of exciting and means for determining vibration characteristics in aeronautical propellers or other similar structures subject to natural vibration or vibrations induced by an external exciting force or forces.

Many difficulties have been experienced in the design of aeronautical propellers in the past, chiefly among which appear propeller failures due to fracture of the blades caused by bad resonant vibration conditions. A study of the failures occurring in propeller blades reveals the fact that practically all fractures have been due not only to inherent propeller vibrations but also to vibrations induced by vibration of the crank shaft of an engine or a combination of crank shaft vibrations, propeller vibrations, and vibrations excited by the passage of the blades of the propeller past an adjacent object or objects, such, for example, as the landing gear or the leading or trailing edges of the wings of an aircraft.

Experience has taught that fracture of the blades arising from combinations of engine vibration and propeller vibration are induced, in part, from the following sources: first, bad resonant crank shaft vibration; second, resonant vibration frequencies in the propeller blades coinciding with resonant crank shaft vibration; third, failures caused by the fundamental or higher frequencies of the blades being excited by resonant crank shaft vibrations; fourth, shank failures. In these last-mentioned types of failures, if the resonant frequency of the engine crank shaft does not coincide with any of the natural frequencies of the propeller blade, failures due to forced bending near the point where the blade enters the propeller hub often occurs. The cause of this type of failure can be explained in the following manner: The moment of inertia of the rotating blade is very high and a flywheel effect is produced that tends to make the blades rotate at a uniform speed. When bad crank shaft resonance occurs the hub portion tends to accelerate and decelerate once during each cycle of vibration of the engine crank shaft, the result being that high bending stresses are produced near the shank of the blade. These stresses, added to the high centrifugal stresses in this region of the blade, often produce stresses the magnitude of which are sufficient to cause blade failures. This type of blade failure is the most dangerous of all, since the unbalanced centrifugal force on the remaining blades tears the engine out of the airplane and is the one most to be avoided in the design of the blade.

Bad resonant vibration conditions exist in the majority of aircraft engines which have been developed in the past due to engine explosion and inertia impulses. In attempting to prevent these destructive forces reaching the propeller blades, devices of many types have been suggested in order to eliminate resonant crank shaft vibration, including the use of dampening devices or the application of flexible spring drives to obtain smooth driving characteristics. In some instances controllable pitch propellers have been suggested or operating restrictions have been placed on the engine to prevent operation under bad resonant crank shaft conditions, but these remedies serve to modify for the purpose of eliminating the underlying source of failure.

The proof that most propeller failures arise from vibratory motion is contained in the fact that many propellers that fail during flight test will successfully pass a destructive whirling test on a dynamometer test rig at twice as much horsepower where the driving torque is smooth and continuous.

Flight tests are, of course, the ultimate criterion of the maximum efficiency of the propeller, engine, and airplane combined. The effect of each of these upon the other is such that, in the final analysis, they must be considered together and not separately if the best combination from a practical standpoint is to be arrived at.

Inasmuch, however, as the propeller forms the primary source of propulsion for an aircraft, regardless of the relative efficiency of the motor and/or fuselage construction, a study of the types of vibration possible in aircraft propellers under static conditions is essential in order to arrive at a better understanding of its performance under dynamic or actual flight conditions.

From a practical standpoint the propeller may be considered as a tapered twisted beam, the blades having a low value of I minor at all points except at stations near the hub which allows them to deflect easily about the I minor axis, resulting in comparatively low resonant frequencies of vibration compared to the resonant frequencies of vibration about the I major axis.

The blades have a very high value of I major throughout their length which practically prevents deflection about the I major axis. For this reason, the resonant frequencies about the I major axis will be extremely high compared to the resonant frequencies about the I minor axis and would be difficult to obtain by any exciting force encountered in flight.

A torsional resonant frequency of vibration can be excited about the center line of the propeller blade which will have a high frequency. Due to the nature of the cross-section of the propeller blades, the natural frequencies for two nodes, three nodes, etc., are not true multiples (higher harmonics) of the frequency causing the single node (fundamental harmonic). For this reason, the resonant vibration frequencies will be hereinafter referred to as one-, two-, three-, and four-node types of resonant vibration frequency in order to distinguish them from secondary vibrations or harmonics of the fundamental vibration as they are usually referred to in the science of sound.

The methods of testing elastic bodies, and particularly aeronautical propellers, have hitherto consisted in subjecting the propeller to a destructive whirling test on a dynamometer test rig. This method of testing consisted generally in running the propeller at various speeds for predetermined periods of time with the blades set at various angles and obtaining the deflection of the blades at various stations and the flutter present in the blades. The primary reason for testing propellers on a destructive whirling test rig was to be as nearly as possible absolutely sure that no propeller of any particular design or construction would break while in service operation on an airplane. The determination of alterations in length, stresses at their snapping points, or their resistance to torsion can not, however, be satisfactorily obtained by this method of testing primarily by reason of the fact that the propellers were tested under the most favorable conditions in which the driving torque of the dynamometers was constant and smooth as compared to the intermittent impulses arising from engine explosions or inertia forces to which the propeller is subjected under actual flight conditions. The stresses imposed were generally purely dynamic and vibration stresses were not present.

In accordance with the present invention, a statical method is utilized for producing and distinguishing frequencies of vibration and one of the important objects resides in the novel method of obtaining resonant vibration frequencies of a propeller under static conditions from which sufficient data may be obtained which makes possible the improved design of a propeller having vibration characteristics that will not be excited in the engine R. P. M. range used in flight.

Another important feature and object of the invention consists in the propeller to be tested being resiliently suspended in a suitable support of such an elasticity that the suspended propeller will have a natural frequency lower than the lowest single node resonant frequency or the fundamental frequency of the propeller blades and exciting the suspended propeller into vibration at a comparatively low frequency by an exciting force supplied from any suitable mechanical or electrical means designed to execute vibrations. By resiliently suspending the propeller, as aforementioned, the energy is not only prevented from being dissipated through the suspension system, as would be the case were the propeller rigidly or semi-rigidly supported on a vibrating base, but the propeller is thereby suspended in a manner such as to permit free vibration at all its natural nodes.

In conjunction with this feature of the present invention, I contemplate the use of either a reciprocating weight- or a rotating eccentric weight-type of vibrator mounted on the propeller hub, each reciprocation of the weight of the first-mentioned type or each revolution of the eccentric weight of the last-mentioned type producing one exciting impulse which is imparted to the suspended propeller. When the frequency of the exciting force produced by the exciting means corresponds with any of the natural frequencies of the propeller blades, violent vibration occurs in the propeller.

When propeller vibration is produced, the frequency of vibration may be determined by ascertaining the speed of reciprocation or of rotation of either type of vibrator with the aid of any conventional type of frequency meter such, for example, as vibrating reeds, rotoscopes, tachometers, etc.

Various methods of mounting of the vibrators on the hub of the propeller may be employed to produce various types of vibration in the propeller. That is to say, with the vibrator mounted on the hub in one manner, a one-, two-, three-, four-, or five-node type of vibration with a loop at the center line of the hub will be produced; with the vibrator mounted in still another manner, a one-, two-, three-, four-, or five-node type of vibration with a node at the center line of the hub will be produced.

Certain advantages as well as disadvantages are found to result in the use of the two types of vibrators employed.

If reciprocating weight types of vibrators are used, it is definitely known from the method of mounting whether the type of vibration has a loop at the center line of the hub or a node at the center line of the hub. The main objection to the use of reciprocating weights for determining resonant vibration frequencies above a single node type of vibration resides in the difficulty of running reciprocating weights at high speeds.

The higher vibration frequencies can be found by using a vibration frequency that is one third, one fifth, one seventh, or one ninth of the higher frequencies; for example, if a two-node type of vibration is obtained by running the reciprocating weight at a frequency of 1440 V. P. M. and 2400 V. M. P., it is known that the true vibration frequency of the blade is 7200 V. P. M., since 1440×5=7200 V. P. M. and 2400×3=7200 V. P. M. A vibrating reed tachometer, when placed on the hub of the propeller, will also show that the blade is vibrating at a frequency of 7200 V. P. M.

If this system is used, it should be noted that the fundamental speeds of one half, one fourth, or one sixth of the higher resonant frequency cannot be used to obtain the higher resonant frequencies. For example, a good two-node vibration period cannot be obtained by running at a fundamental speed of ½×7200=3600 V. P. M. of ¼×7200=1800 V. P. M.

It is difficult to obtain the location of nodes near the hub by this method. This is probably due to the small amount of energy in the fundamental exciting force.

On the other hand, rotating eccentric weight-types of vibrator can be easily driven at speeds of from 400 to 22,000 V. P. M. The vibrating forces can be easily changed for any speed by using different sizes of eccentric weights. All types of vibration can be obtained with the rotating weights on one type of fitting. It is impossible to produce the high resonant frequencies in a propeller by running the rotating eccentric weights at one third, one fifth, one seventh, or one ninth the speed of the high resonant frequency. This is because the rotating weight produces disturbing forces during certain parts of the cycle of rotation that prevent true harmonics from building up in the propeller blade.

Another important feature of the present invention resides in the novel method of determining the types of vibration present in the propeller at various resonant vibration frequencies.

The first step in determining the type of vibration in the propeller consists in sprinkling fine wood dust or sand on the face of the vibrating blade. When a resonant vibration frequency of the blade is reached, practically all of the dust immediately shakes off the blade except at the nodal points which remain practically stationary. From the dust pattern thus produced, it is possible to determine whether the blade has a type of vibration with one, two, three, four, or five standing nodes on each blade. The nodal point or points in the vicinity of the nodal point nearest the tip will be the points of maximum stress in the blades due to vibration and will be the points at which the propeller will fail if the vibration stresses, plus normal stress, exceed the endurance or elastic limit of the material of the blades.

The type of bending in the blade is next determined by finding the phase relation of the vibrating blade tips and the nature of movement of the hub. This is accomplished by allowing the vibrating propeller to act as a circuit breaker and thereby control the passage of current through any suitable source of light for a portion of each cycle of vibration.

In accordance with this feature of the invention, I employ an electric lamp in series with a source of electric energy such, for example, as a storage battery. By holding the ends of the wires connecting the lamp and battery so that both blades make contact on the up stroke of the cycle of vibration, current will pass through the blade and light the lamp and indicate that the blade tips are in phase. This method can be employed to identify all types of vibration having one, two, three, four, or five nodes for blade with a loop at the center line of the hub.

This same method can be employed in ascertaining movement of the hub and movement of the blade tips for a type of vibration having one node on each blade with a node at the center line of the propeller hub.

In a two-bladed propeller, all types of vibration with a node at the center line of the hub will have one blade tip up while the other blade tip is down. To test for a node at the center line of the propeller hub, it is necessary to hold one wire above the blade so that it makes contact on the upper half of the cycle of vibration and one wire below the other blade so that it makes contact on the lower half of the cycle of vibration of this blade.

In a three-bladed propeller, the tips of two blades will be found to be on the up stroke of the cycle of vibration while the tip of the third blade is on the down stroke. It is necessary therefore to hold one wire on the face side near the tip of one blade and to determine the relative movement of the other two blades with respect to this one blade in the manner suggested above.

In a four-bladed propeller, the tips of two adjacent blades will be found to be on the up stroke of the cycle of vibration while the tips of the two remaining blades are going down. This circuit can be employed to identify all types of vibration having one, two, three, four, or five nodes per blade with a node at the center line of the propeller hub.

*Conclusions*

From the foregoing it will be observed that I have provided a new and novel method of not only determining types of vibration possible in aircraft propellers but also for determining resonant frequencies and the location of nodal points. If the original design of propeller is found to have bad resonant frequencies which will be excited by impulses from the engine within the flying range of engine speeds, alterations in the design can be made to shift these resonant frequencies outside the desired range of engine speeds so that the propeller will be safe for all angles and all desired engine speeds required in flight.

An advantage of the present invention resides especially in the simplicity of the apparatus used and the efficiency and effectiveness of the results obtained and in the novel method employed for determining the phenomena occurring during such vibrations and distinguishing between types of vibration whereby there may be obtained resonance characteristics of the element or structure excited into vibration.

These resonance characteristics furnish valuable data as to the behavior of the propeller or other vibratory structure and from it the dangerous range of operation can be determined and avoided.

The particular apparatus for accomplishing these results and for achieving the stated and other objects of the invention that will be apparent upon further consideration of this specification is described in detail and shown in the accompanying drawings of which:

Fig. 1 is a diagrammatic view of a propeller illustrating a type of vibration having a loop at the center line of the propeller hub;

Fig. 2 illustrates diagrammatically the resultant inertia forces produced in the tips of the propeller blades when the exciting force is applied in one direction;

Fig. 3 illustrates diagramatically the resultant inertia forces produced in the tips of the propeller blades when the exciting force is applied in the opposite direction;

Fig. 4 illustrates diagrammatically a reciprocating weight-type of vibrator and method of mounting same to the propeller hub to excite the forces illustrated in Figs. 1, 2, and 3;

Fig. 5 illustrates diagrammatically the method of mounting of a rotating eccentric weight-type of vibrator to excite the propeller into vibration to cause it to vibrate in the manner illustrated in Figs. 1, 2, and 3;

Fig. 6 is a diagrammatic view of a propeller illustrating a type of vibration having a loop at the center line of the propeller hub;

Fig. 7 is a top plan view of Fig. 6 illustrating the direction and manner in which the exciting forces are applied to produce the vibration illustrated in Fig. 6;

Fig. 8 illustrates diagrammatically the resultant torque forces produced tending to turn the propeller about the axis of its rotation when the exciting force, as shown in Fig. 7, is applied in one direction;

Fig. 9 illustrates diagrammatically the resultant torque forces produced tending to turn the propeller about the axis of its rotation when the exciting force, as shown in Fig. 7, is applied in the opposite direction;

Fig. 10 illustrates diagrammatically the method of mounting of a reciprocating weight-type of vibrator to the propeller hub to excite the forces shown in Figs. 6, 8, and 9;

Fig. 11 illustrates diagrammatically the method of mounting of a rotating eccentric weight-type of vibrator to excite the propeller into vibration in the manner illustrated in Figs. 6, 8, and 9;

Fig. 12 is a diagrammatic view of a propeller illustrating a type of vibration having a node at the center line of the propeller hub;

Fig. 13 illustrates diagrammatically the resultant inertia forces produced in the tips of the propeller blades when the exciting force is applied in one direction;

Fig. 14 illustrates diagrammatically the resultant inertia forces produced in the tips of the propeller blades when the exciting force is applied in the opposite direction;

Fig. 15 illustrates diagrammatically the method of mounting a reciprocating weight-type of vibrator to the propeller hub to excite the forces shown in Figs. 12, 13, and 14;

Fig. 16 is a diagrammatic view of a propeller hub illustrating a type of vibration having a node at the center line of the propeller hub;

Fig. 17 is a top plan view of Fig. 16 illustrating the direction in which the exciting forces are applied;

Fig. 18 illustrates diagrammatically the resultant inertia forces produced in the tips of the propeller blades when the exciting force of Fig. 17 is applied in one direction;

Fig. 19 illustrates diagrammatically the resultant inertia forces produced in the tips of the propeller blades when the exciting force of Fig. 17 is applied in the opposite direction;

Fig. 20 illustrates diagrammatically the method of mounting of a reciprocating weight-type of vibrator to the propeller hub to excite the forces shown in Figs. 17, 18, and 19;

Fig. 21 is a diagrammatic view of a propeller illustrating another type of vibration having a node at the center line of the propeller hub;

Fig. 22 is a top plan view of Fig. 21;

Fig. 23 illustrates diagrammatically the resultant inertia forces produced in the tips of the propeller blades when the exciting force shown in Fig. 21 is applied in one direction;

Fig. 24 illustrates diagrammatically the resultant inertia forces produced in the tips of the propeller blades when the exciting force is applied in the opposite direction;

Fig. 25 illustrates diagrammatically the method of mounting the reciprocating weight-type of vibrator to the hub of a propeller to excite the forces shown in Figs. 21, 23, and 24;

Fig. 26 illustrates the method of mounting the eccentric rotating weight-type of vibrator to the hub of a propeller to excite the forces shown in Figs. 21, 23, and 24;

Fig. 27 is a plan view, partially in section, of a reciprocating weight-type of vibrator;

Fig. 28 is a sectional view taken on the line 28—28 of Fig. 27;

Fig. 29 illustrates diagrammatically the electric circuit employed for determining a loop type of vibration at the center line of the propeller hub;

Fig. 30 illustrates diagrammatically the electric circuit employed for determining a node type of vibration at the center line of the propeller hub;

Fig. 31 illustrates types of node vibrations for a propeller with a loop at the center line of the propeller hub when the vibrating forces are applied on the center line of the propeller hub;

Fig. 32 illustrates types of node vibrations for a propeller with a node at the center line of the propeller hub when the vibrating forces are applied at right angles to the center line of the propeller hub.

Figure 33:
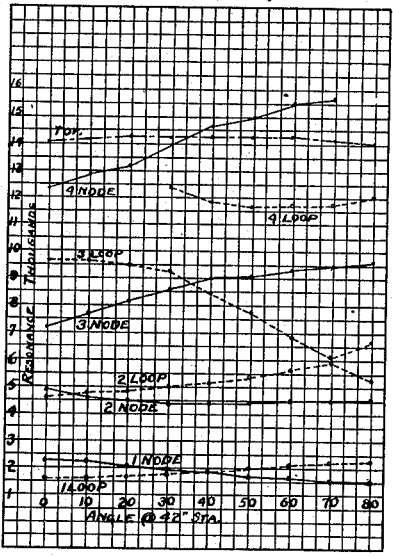
Figs. 33 and 34 represent curves plotted for resonant vibrations against various blade angle settings.
Figure 34:
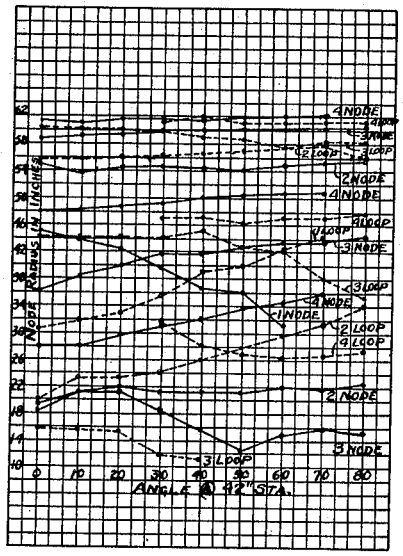

Referring more particularly to the drawings wherein corresponding parts are designated by like numerals throughout the several views, the means employed for producing vibration and methods of ascertaining and distinguishing between types of vibration produced will, for the sake of clarity, be divided into various illustrative cases with the exciting member arranged in predetermined positions on the propeller hub.

The apparatus used consists, in part, of an elastic suspension member 10 in which the propeller or other vibratory structure to be tested is suspended. In accordance with the present embodiment of the invention I employ shock absorbing cord which is looped around the propeller in the manner indicated in Figs. 10 and 11, although it is to be understood that any other suitable means, such, for example, as spring means, may be employed for resiliently suspending the test object. It is important, however, that in any instance the cord or other resilient member be of such an elasticity that the suspended propeller will have a natural frequency lower than the lowest single node resonant frequency of the propeller. This is done to prevent energy from being dissipated through the suspension system.

Any suitable means may be employed for producing resonant frequency vibrations. I have found that where speed ranges of from zero to 3600 R. P. M. are to be obtained, reciprocating weight types of vibrators may be employed. As shown more particularly in Figs. 27 and 28, this type of vibrator comprises generally a housing 11 having rotatably mounted therein an antifriction bearing 12, a drive shaft 13 adapted for connection with the driving end of a remotely controlled power mechanism (not shown) through the medium of a flexible driving connection identified by the numeral 14. The inner end of the drive shaft 13 is formed with an outwardly projecting flanged portion 15 and a diametrically opposite counterbalancing portion 16. The flanged portion 15 is provided with an opening 17 adjacent its outer extremity within which is received the inner end of a stud 18. For convenience, this stud may be locked in place by a pin 19 which passes through suitable laterally disposed openings provided on the inner end of the stud 18 and the flanged portion of the drive shaft. The outer end of the stud 18 is slidable in a transverse slotted opening 20 formed in a reciprocating member 21 adapted to reciprocate in a vertical plane when the drive shaft 13 is rotated. Suitable guide ways 22 formed by the inner surfaces of the side walls of the housing guide the reciprocating member when it is being reciprocated by rotation of the drive shaft 13. The bottom of the housing 11 may be provided with a T-shaped slot 23 within which is received the correspondingly shaped head 24 of a locking bolt 25 which accommodates a hand or wing nut 26 and a clamping plate 27 in order to permit the housing to be rigidly clamped on the propeller hub or other vibratory structure to be tested. In cases where higher speed ranges are desirable, rotating eccentric weighting vibrators or motors of the air-driven type may be employed consisting of an eccentric weighted member rotatably mounted on an air-driven implement of the type set forth in Patents No. 1,322,107, issued November 18, 1919, to Albert Carlos, Gressle, and Ralph Asbury, and No. 1,758,760, issued May 13, 1930, to William W. Price and Charles W. Ripsch.

In either of the above instances the vibrators are run at various speeds until a resonant frequency is obtained.

After the propeller is excited into vibration and resonant frequency is obtained, fine wood dust is sprinkled on the face side of the blade to determine the location of nodal points, the number of nodes on the blades and the direction of rotation of the dust about the nodal points.

The next step consists in ascertaining the speed of rotation of the air motor. This is accomplished by using a "rotoscope" of the Ashdown type, the speed of which is pre-set for a speed that is known to be above the rotational speed of the eccentric rotating weight. The speed of the rotoscope is then gradually decreased until the rotating weight appears to be stationary. The first distinct stationary image of the rotating weight C will give the true speed of the rotating weight. This method prevents obtaining speeds that are one half or one fourth of the true rotational speed.

By increasing the speed of rotation of the eccentric weight, one-, two-, three-, or four-node resonant frequencies of vibration may be produced. The type of vibration produced, for example, a one-, two-, three-, four-, or five-node type of vibration with a loop at the center line of the hub or a one-, two-, three-, four-, or five-node type of vibration with a node at the center line of the hub or torsional type of blade vibration, is dependent upon the manner of mounting of the vibrator on and with respect to the propeller's axis of rotation.

Types of vibration may be readily ascertained by the electric circuit method hereinabove set forth, the same being diagrammatically illustrated in Figs. 29 and 30 wherein the numeral 28 indicates an electric battery having a lamp 29 connected in series therewith and the ends of the lead wires 30 and 31 positioned either to contact the tips of both blades on the upper half of the cycle of vibration, Fig. 29, or one wire making contact when one blade is on the upper half of the cycle of vibration and the other wire making contact when the outer blade is on the lower half of the cycle of vibration, Fig. 30.

TYPES OF VIBRATION

CASE I

*Loop at center line of propeller hub.—Type of vibration caused by reciprocating forces on axis of rotation (See Figs. 1, 2, 3, 4, and 5.)*

If force (a) is applied upward along the axis of rotation as shown in Fig. 1, a downward inertia force is induced in each tip. When force (b) is applied downward as shown in Fig. 1, an upward inertia force is induced in each tip. This produces a loop at the center line of the propeller hub. This type of vibration can be produced by a reciprocating weight mounted as shown in Fig. 4. This type of vibration can also be produced by the vertical component of a rotating eccentric weight mounted as shown in Fig. 5.

One-, two-, three-, four-, and five-node types of resonant vibration with a loop at the center line of the propeller hub, as shown in Fig. 31, can be produced by the reciprocating weight or the rotating eccentric weight mounted as stated above.

CASE II

*Loop at center line of propeller hub.—Type of vibration produced by torque forces tending to turn the propeller about the axis of propeller rotation (See Figs. 6, 7, 8, 9, 10, and 11.)*

If a torque force (c) is applied to rotate the propeller about its axis of rotation as shown in Fig. 8, a downward inertia force is induced in each tip. When torque force (d) is applied as shown in Fig. 9, an upward inertia force is induced in each tip. This produces a loop at the center line of the propeller hub. This action is a result of the blades being set at an angle to the plane of rotation, and also is due to the fact that the high value of I major prevents bending about the I major axis. The deflection takes place about the I minor axis and a resonant frequency of the same value as that obtained in Case I is produced. This type of vibration can be produced by a reciprocating weight mounted as shown in Fig. 10.

This type of vibration can also be produced by the horizontal component of a rotating weight mounted as shown in Fig. 11. One-, two-, three-, four-, and five-node types of resonant vibration with a loop at the center line of the propeller as shown in Fig. 31 can be produced by either the reciprocating or rotating eccentric weight mounted as stated above.

CASE III

*Node at center line of propeller hub.—Type of vibration caused by reciprocating forces parallel to the center line of the blades and passing through the axis of rotation of the propeller in such a manner as to impose torque force on the hub (See Figs. 12, 13, 14, 15, and 5.)*

If a torque force (f) is applied which tends to rotate the propeller in the manner shown in the above figures, an upward inertia force is induced in tip 1, Fig. 13, and a downward inertia force is induced in tip 2. If a force (e) is applied as shown in Fig. 12, a downward inertia force is induced in tip 1, and an upward inertia force is induced in tip 2. This produces a node at the center line of the propeller hub.

This type of vibration can be produced by a reciprocating weight mounted as shown in Fig. 15. This type of vibration can also be produced by the horizontal component of an eccentric rotating weight mounted as shown in Fig. 5. One-, two-, three-, four-, and five-node types of resonant vibration with a node at the center line of the propeller hub as shown in Fig. 32 can be produced by the reciprocating weight or an eccentric rotating weight mounted as stated above.

CASE IV

*Node at center line of propeller hub.—Type of vibration caused by reciprocating forces in the plane of rotation and at right angles to the center line of the propeller blades (See Figs. 16, 17, 18, 19, 20, and 11.)*

If a force (g) is applied to the propeller as shown in the above figures, an upward inertia force is induced in tip 1, and a downward inertia force is induced in tip 2. If force (h) is applied, a downward inertia force is induced in tip 1, and an upward inertia force is induced in tip 2. This produces a node at the center line of the propeller hub. This is a result of the blades being set at an angle with respect to the applied force and also is due to the fact that I major is large enough to practically prevent deflection about the I major axis. Therefore, the deflection takes place about the I minor axis, giving the same resonant vibration type of node at center line of propeller hub as is produced in Case III.

This type of vibration can be produced by a reciprocating weight mounted as shown in Fig. 20. This type of vibration can also be produced by the vertical component of a rotating eccentric weight mounted as shown in Fig. 11. One-, two-, three-, four-, and five-node types of resonant vibration with a node at the center line of the propeller hub, as shown in Fig. 32 can be produced by the reciprocating weight or an eccentric rotating weight mounted as stated above.

CASE V

*Torsional type of propeller vibration with a node down the center line of the propeller blade produced by reciprocating forces rotating the blade clockwise and counterclockwise about the torsional axis of the blade (See Figs. 21, 22, 23, 24, 25, and 26.)*

If force (i) is applied as shown in Fig. 21, an inertia force will be induced upward in the trailing edge and downward in the leading edge of blade 1. These forces tend to rotate the blade torsionally about the axis of the blade in a clockwise direction. If force (j) is applied as shown in Fig. 21, an inertia force will be induced downward in the trailing edge and upward in the leading edge of blade 1. These forces tend to rotate the blade about the torsional axis in a counter-clockwise direction.

When a resonant frequency is reached, the node will appear over the center line of the propeller blade. This type of vibration can be produced by a reciprocating weight mounted as shown in Fig. 25. This type of vibration can also be produced by the horizontal component of a rotating weight mounted as shown in Fig. 26.

Although I have shown and described the present preferred embodiment of my invention, it is self-evident that the apparatus for practicing the invention may be constructed in many other ways, for it is to be understood that the specific terms used in describing the various parts of the apparatus are for the purpose only of clearly disclosing workable embodiments of the invention and are not to be interpreted as limiting the scope of the invention as defined in the appended claims.

What I claim as new and desire to secure by Letters Patent is:

1. The method of predetermining wave phenomena in a propeller blade to obtain its resonant characteristics at different frequencies, which consists in the steps of supporting the propeller in balanced relation about its axis of rotation, subjecting the mid point of the propeller to an exciting force in a predetermined direction with respect to said axis of rotation to cause it to vibrate at a resonant vibration frequency with a predetermined vibration characteristic at the mid point of the propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

2. The method of predetermining wave phenomena in a propeller blade to obtain its resonant characteristics at different frequencies, which consists in the steps of supporting the propeller in balanced relation substantially free and unrestrained to vibrate about its axis of rotation, subjecting the mid point of the propeller to an exciting force in a predetermined direction with respect to said axis of rotation to cause it to vibrate at a resonant vibration frequency with a predetermined vibration characteristic at the mid point of the propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

3. The method of predetermining wave phenomena in a propeller blade to obtain its resonant characteristics at different frequencies, which consists in the steps of supporting the propeller in balanced relation about an axis of vibration, subjecting the mid point of the propeller to an exciting force in a predetermined direction with respect to the axis of rotation to cause it to vibrate at a resonant vibration frequency about said axis of vibration with a predetermined vibration characteristic at the mid point of the propeller; and detecting and directly distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

4. The method of predetermining wave phenomena in a propeller blade to obtain its resonant characteristics at different frequencies, which consists in the steps of supporting the propeller in balanced relation substantially free and unrestrained to vibrate about an axis of vibration, subjecting the mid point of the propeller to an exciting force in a predetermined direction with respect to the axis of rotation to cause it to vibrate at a resonant vibration frequency about said axis of vibration with a predetermined vibration characteristic at the mid point of the propeller, and detecting and directly distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

5. The method of predetermining wave phenomena in a propeller blade to obtain its resonant characteristics at different frequencies, which consists in the steps of supporting the propeller in balanced relation about a plurality of axes of vibration, subjecting the mid point of the propeller to an exciting force in a predetermined direction with respect to the axis of rotation to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

6. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force in a predetermined direction with respect to the axis of rotation to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

7. The method of predetermining wave phenomena in a propeller blade to obtain its resonant characteristics at different frequencies, which consists in the steps of supporting the propeller in balanced relation substantially free and unrestrained against vibration about two axes of vibration that are at right angles to one another, subjecting the mid point of the propeller to an exciting force in a predetermined direction with respect to the axis of rotation to cause it to vibrate at a resonant vibration frequency about one of said axes of vibration with a predetermined vibration characteristic at the mid point of the propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

8. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force applied in the direction of its axis of rotation to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

9. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force eccentric with respect to its axis of rotation to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

10. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to a torque force tending to turn the propeller about its axis of rotation to cause it to vibrate at a resonant vibration frequency with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

11. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force parallel to the center of the blades and passing through the axis of rotation of the propeller in such a manner as to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

12. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force parallel to the center of the blades and passing through the axis of rotation of the propeller in such a manner as to impose a torque force on the hub and to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

13. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force in the plane of rotation and at right angles to the center line of the propeller blades to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

14. The method of predetermining wave phenomena in a propeller blade to obtain its resonant characteristics at different frequencies, which consists in the steps of supporting the propeller in balanced relation substantially free and unrestrained to vibrate about a plurality of axes of vibration, subjecting the mid point of the propeller to an exciting force tending to rotate the propeller blades clockwise and counterclockwise about the torsional axis of the blades to cause it to vibrate at a resonant vibration frequency about one of said axes of vibration with a predetermined vibration characteristic at the hub of said propeller, and detecting and distinguishing the nodal characteristics of the vibration of the blades of said propeller and thereafter reproportioning the propeller profile to cause such resonant characteristics that produce excessive stresses in the propeller blade to occur outside the normal operating speed range of said propeller under similar operating conditions.

15. The method of predetermining wave phenomena in a propeller blade to obtain its resonant characteristics at different frequencies, to secure freedom from dangerous critical speeds which comprises the steps of supporting the propeller about its axis of rotation, subjecting the mid point of the propeller to exciting forces in a predetermined direction at different speeds to cause the blade to vibrate at different resonant vibration frequencies with a predetermined vibration characteristic at the mid point, detecting and distinguishing the nodal characteristics of the vibrations of the propeller blade and thereafter reproportioning the propeller profile to cause such resonant characteristics that produce excessive stresses in the blade to occur outside the normal operating speed range of said propeller under similar operating conditions.

16. The method of predetermining wave phenomena in a propeller blade to obtain its resonant characteristics at different frequencies, to secure freedom from dangerous critical speeds which comprises the steps of supporting the propeller about its axis of rotation, subjecting the mid point of the propeller to exciting forces in different predetermined directions at different speeds to cause the blade to vibrate at different resonant vibration frequencies with different predetermined vibration characteristics at the mid-point, detecting and distinguishing the nodal characteristics of the vibrations of the propeller blade and thereafter reproportioning the propeller profile to cause such resonant characteristics that produce excessive stresses in the blade to occur outside the normal operating speed range of said propeller under similar operating conditions.

17. The method of predetermining wave phenomena in a propeller blade to obtain its resonant characteristics at different frequencies, to secure freedom from dangerous critical speeds which comprises the steps of supporting the propeller about its axis of rotation, subjecting the mid point of the propeller to exciting forces in different predetermined directions at different speeds to cause the blade to vibrate at different resonant vibration frequencies with different predetermined vibration characteristics at the mid-point, detecting and distinguishing the nodal characteristics of the vibration of the propeller, and of repeating the last two steps for each of a number of blade angle settings for a given range to determine the frequency characteristic curve for said range and thereafter reproportioning the propeller profile to cause such resonant characteristics that produce excessive stresses in the blade to occur outside the normal operating speed range of said propeller under similar operating conditions.

HOWARD H. COUCH.